United States Patent [19]

Köthe et al.

[11] 3,928,078
[45] Dec. 23, 1975

[54] AUTOMATICALLY ACTIVATED BATTERY ASSEMBLY

[75] Inventors: Hans-Kurt Köthe, Kelkheim, Taunus; Rudi Schneider, Falkenstein, Taunus, both of Germany

[73] Assignee: Varta Batterie Aktiengesellschaft, Hanover, Germany

[22] Filed: June 5, 1974

[21] Appl. No.: 476,719

[30] Foreign Application Priority Data
June 8, 1973 Germany............................ 2329362

[52] U.S. Cl. ................. 136/114; 136/162; 136/178
[51] Int. Cl.² ......................................... H01M 1/06
[58] Field of Search ........... 136/114, 162, 160, 159, 136/180, 177, 178; 141/59; 137/260

[56] References Cited
UNITED STATES PATENTS

| | | |
|---|---|---|
| 2,810,776 | 10/1957 | Brill et al. ............................ 136/162 |
| 2,899,481 | 8/1959 | Kardorff ............................. 136/162 |
| 3,372,716 | 3/1968 | Hommel et al. ................. 136/162 X |
| 3,855,005 | 12/1974 | Huhta-Koivisto ............... 136/100 R |

*Primary Examiner*—Anthony Skapars
*Attorney, Agent, or Firm*—Herbert L. Lerner

[57] ABSTRACT

Automatically activated battery assembly including a battery having a plurality of cells, an electrolyte chamber separated from the cells, venting line means and activation line means connecting the cells with the electrolyte chamber, valve means connected in the venting line means and having a vent opening, pressure gas chamber means connected by the activation line means to the electrolyte chamber, valve means connected in the activation line means and having a vent opening, an aperture member connected in the activation line means, and venting means communicating with the activation line means and adjustable for decreasing pressure in the activation line means.

6 Claims, 2 Drawing Figures

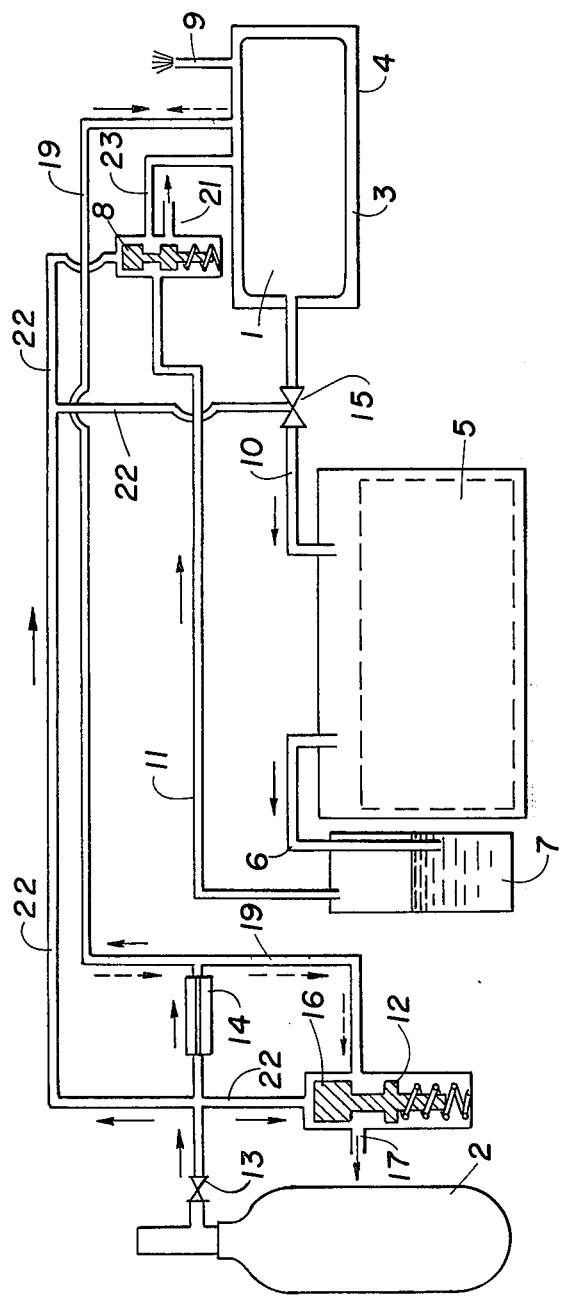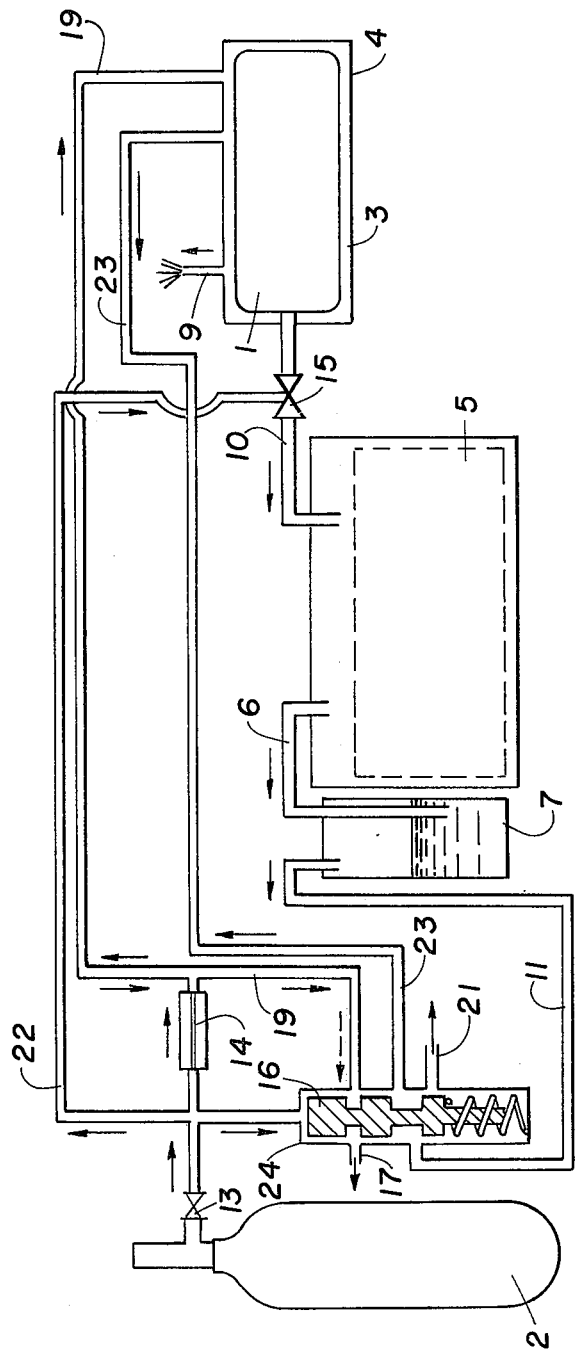

AUTOMATICALLY ACTIVATED BATTERY ASSEMBLY

The invention relates to an automatically activated battery assembly with electrolyte chambers separated from the individual cells, and a pressure gas container.

In rapidly activated batteries, the electrolyte is pressed with the aid of pressure gas through a pipe-line system into the cells, the electrolyte being forced out of pockets or other reservoirs.

There is always the problem of the venting of the cell during the discharge i.e. the removal of the gas developing during the discharge process and, if no membrane is provided between pressure gas and electrolyte, during the activating process of the cell, the removal of the pressure gas and the gas developing during the discharge process.

If adequate amounts of these gases cannot be removed, the danger arises that the cells may burst during the discharge process and electrolyte may escape from the battery.

It is accordingly an object of the invention to provide an automatically activated battery assembly that avoids the foregoing disadvantages of the heretofore known batteries of this general type and which more specifically avoids bursting during the discharge process as well as escape of electrolyte from the battery.

With the foregoing and other objects in view, there is provided, in accordance with the invention, an automatically activated battery assembly comprising a battery having a plurality of cells, an electrolyte chamber separated from the cells, venting line means and activation line means connecting the cells with the electrolyte chamber, valve means connecting in the venting line means and having a vent opening, pressure gas chamber means connected by the activation line means to the electrolyte chamber, valve means connected in the activation line means and having a vent opening, an aperture member connected in the activation line means, and venting means communicating with the activation line means and adjustable for decreasing pressure in the activation line means.

Other features which are considered as characteristic for the invention are set forth in the appended claims.

Although the invention is illustrated and described herein as embodied in an automatically activated battery assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a schematic view of the automatically activated battery of the invention which has two slide valves; and FIG. 2 is another embodiment of FIG. 1 having a single slide valve that regulates the reliable function of the battery during activation and discharge operations.

Similar features in both embodiments are identified by the same reference numerals.

Referring now to the drawing and first, particularly, to FIG. 1 thereof, there is shown a system wherein electrolyte is simultaneously pressed out of several chambers or pockets and fed to the electrochemical cells of a battery. The pressing-out operation is preferably effected by pressure gas from a reservoir 2 of limited volume, the gas being conducted into an expansion space 3 located between a stationary wall 4 and the pocket 1 or a movable wall of one of the aforementioned chambers. When the thus pressurized electrolyte flows out of the pockets 1 or the chambers and into the cells 5, the gas in the cells 5 is displaced and vented from the cells 5 through a common venting pipe 6. In accordance with the invention, this venting pipe 6 ends in an electrolyte trap or non-return container 7 from which the gas escapes through a valve structure or vent 8 and an outlet 21.

In the embodiment of FIG. 1, the valve structure 8 is a slide valve controlled, by a driving gas pipe 22. In a modification of the embodiment of FIG. 1, a safety valve such as a spring-loaded valve can be substituted therefor, in which case the return line 11, 23 is omitted.

Generally, the pressure after pressing the electrolyte out of the chambers or pockets the expansion chamber 3 and the activation gas line 19 are vented. This venting, in accordance with the invention, takes place by means of an outlet that terminates preferably in an adjustable vent or capillary tube 9, providing the advantage that a relatively precise adjustment of the venting time is possible.

After the venting process is completed, the slides of valves 8 and 12 are restored to their initial position. Although the venting period can be selected within a wide range, the length thereof has been established, according to the invention, by the fact that the venting of the expansion chamber 3 or of the line 19 is completed when the cells develop gas during discharge. What is attained thereby is that: — with the use of the slide valve control according to FIG. 1, either the gas is conducted along the path 11 and 23 into the expansion chamber of the pressure gas or — when a safety valve is used instead of a slide valve, the gas can return along a path through the electrolyte canal 10 into the previously emptied electrolyte pocket 1.

Leftover electrolyte entrained by the gas is separated from the gas in both of the foregoing cases in the container 4. The cleaned gas can then be conducted through the activation gas pipe 19 and can be discharged through the outlet 17. In the first of the foregoing cases, the inner cell pressure does not exceed the ambient pressure of the battery. In the second case, naturally, the gas can be discharged only after the electrolyte pocket has been caused to burst by a given superpressure. In the latter case, the pressure exceeds the ambient pressure only by the amount necessary for bursting of the electrolyte pocket.

According to the invention, the vent or valve 12 is included in the system, as described hereinbelow:

Since the gas produced in the cells during the discharge, cannot escape completely through the adjustable vent or capillary tube 9, pressure will increase in the expansion chamber 3 and thereby in the cells 5 within a short time, and would soon considerably exceed the ambient pressure. In order to avoid this, the expansion chamber 3 is opened by the vent or valve 12, according to the invention, when the pressure in the expansion chamber 3 of the gas, that has caused the pressing out of the electrolyte pocket during the activation process, has preferably become about equal to the ambient pressure. The outlet in the expansion chamber 3 is situated in such a manner that only cleaned electrolyte-free gas can escape therethrough. The vent or valve 12 is closed by the highly compressed pressure gas at the start of the activation process, against the bias of a spring, and opens again under this spring pressure as soon as the pressure in the expansion chamber falls below a given value. At this instant, the pressure in the expansion chamber is abruptly reduced to that of the ambient pressure of the battery.

In the embodiment of the invention shown in FIG. 2, the valve structures 8 and 12 have been combined into one unit 24. The sequence of occurrences during operation of this system is described hereinafter with respect to FIG. 2.

Opening of a pressure gas vent 13 permits highly compressed pressure gas from the reservoir 2 to reach a throttling member 14, an electrolyte aperture member 15, and the slide valve 24 virtually simultaneously. The slide 16 closes the outlet 17 and the end of the venting pipe 23 connected to the valve 24, so that pressure can develop in the expansion chamber 3. Simultaneously, the path through the lines 6 and 11 and an opening 21 to the ambiency of the battery is freed for passage by the gas present in the cells 5. The electrolyte aperture member 15, which may be a valve, a bursting membrane or the like, has also opened an outlet of the electrolyte pocket, in the interim. In the pressure chamber 3, pressure of the gas, which has been delayed by the throttling member 14, then develops and presses the electrolyte out of the pocket 1.

The venting through the capillary tube 9 of the expansion chamber 3 already begins during the inflow of the pressure gas and ends before the cells 5 begin to develop gas during their discharge. The end of the venting period is determined by the upward movement of the slide 16 which opens the outlet 17 to the flow of gas from the pressure chamber 3 through the line 19. At the same time, the venting pipe 23 is opened and the outlet 21 is closed, so that the gas escaping from the cells can no longer directly reach the ambiency of the battery through the venting line 11, but only by a detour through the expansion chamber 3, which acts as a cleaning device, and through the activating gas pipe 19, as well as the outlet 17.

With the automatically activated battery constructed in accordance with the invention, an inner pressure is produced in the individual cells during the activation as well as during the discharge of the cells, that inner pressure being only slightly higher than the ambient pressure of the battery, so that bursting of the battery and escape of electrolyte is reliably avoided.

We claim:

1. Automatically activated battery assembly comprising a battery having a plurality of cells, an electrolyte chamber separated from said cells, electrolyte activation line means connecting said cells with said electrolyte chamber, gas venting line means distinct from said electrolyte activation line means connecting said cells with said electrolyte chamber, valve means connected in said gas venting line means and having a vent opening, pressure gas chamber means connected by an activation gas line means to said electrolyte chamber, valve means connected in said activation gas line means and having a vent opening, an aperture member connected in said electrolyte activation line means, and adjustable venting means communicating with said activation gas line means for decreasing pressure in said activation gas line means.

2. Automatically activated battery assembly according to claim 1 including driving gas line means connecting both of said valve means and said aperture member to said pressure gas chamber.

3. Automatically activated battery assembly according to claim 2 including a throttle member connecting said driving gas line means with said activation gas line means.

4. Automatically activated battery assembly according to claim 1 including an electrolyte trap connected in said gas venting line means.

5. Automatically activated battery assembly according to claim 1 wherein both of said valve means form a unitary valve structure.

6. Automatically activated battery assembly according to claim 1 wherein said adjustable venting means is located at said electrolyte chamber connected to said activation gas line means.

* * * * *